Jan. 17, 1928.
W. MOLLER
1,656,566
STEADYING DEVICE FOR VEHICLE WHEELS
Filed Dec. 31, 1926
2 Sheets-Sheet 1
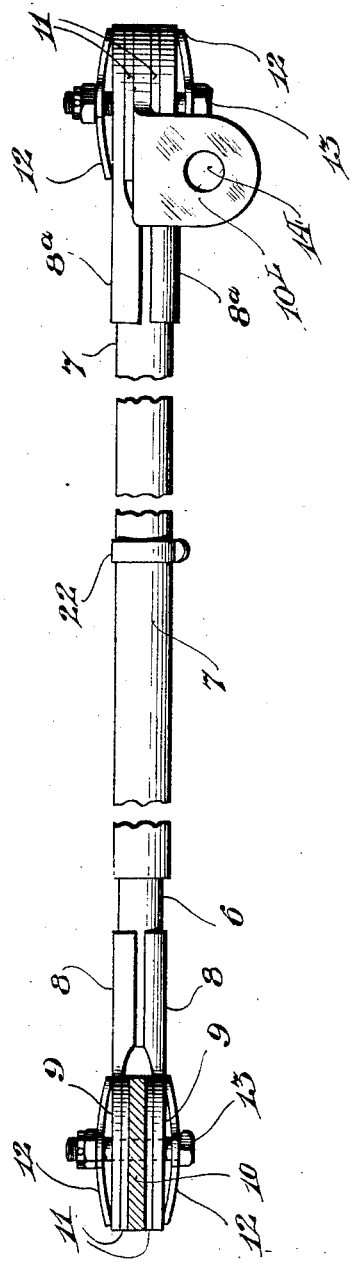
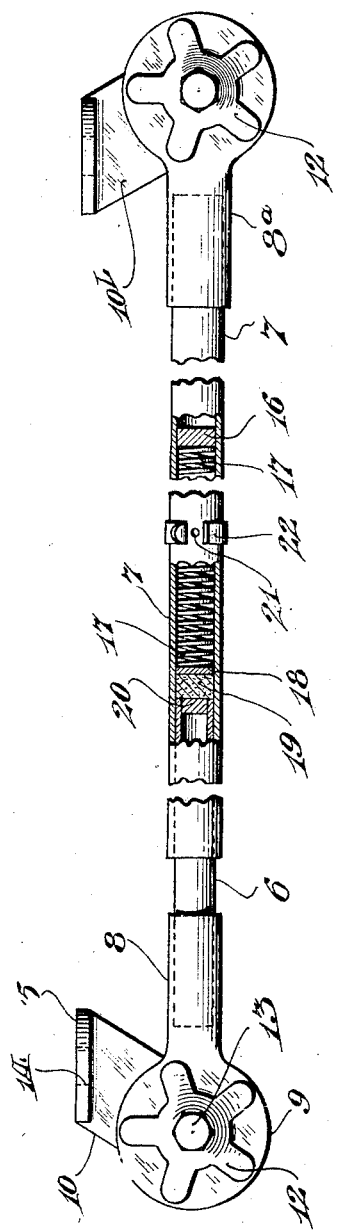
WITNESSES:
INVENTOR:
Wilhelm Moller,
BY
Joshua R. H. Potts
ATTORNEY.

Jan. 17, 1928.  1,656,566

W. MOLLER

STEADYING DEVICE FOR VEHICLE WHEELS

Filed Dec. 31, 1926   2 Sheets-Sheet 2

WITNESSES:

INVENTOR:
Wilhelm Moller,
BY
ATTORNEY.

Patented Jan. 17, 1928.

1,656,566

UNITED STATES PATENT OFFICE.

WILHELM MOLLER, OF UPPER DARBY, PENNSYLVANIA, ASSIGNOR TO FRONT WHEEL CONTROL, INC., OF PHILADELPHIA, PENNSYLVANIA, A CORPORATION OF DELAWARE.

STEADYING DEVICE FOR VEHICLE WHEELS.

Application filed December 31, 1926. Serial No. 158,214.

My invention relates to steadying devices for motor vehicles and more particularly to a device for steadying the front wheels to prevent their wobbling.

It is a well known fact that wobbling or, as it is more popularly termed, "shimmying" of front wheels of motor vehicles is caused by excessive clearances between the front axles and wheel bearings, spindle bolts and bushings, tie rod bolts and bushings, steering worm and worm wheel, and lack of sufficient tension on the springs holding the steering ball in contact with its socket in the drag link. The amount of play in each place may be very slight but, when added together and the total multiplied by the difference between the distance from the outside of the tire to the center of the axle and the distance bewteen the center of the wheel and center of the spindle bolt, it is sufficient to allow the periphery of each wheel to move through an arc of considerable length. This produces an effect which is very annoying and which increases the difficulty of steering the vehicle.

The principal object of my invention is to provide a device which may be mounted on the steering knuckles and which will eliminate the tendency of the wheels to wobble.

Another object of my invention is to so design the device that it may be mounted by an unskilled person on the forward end of the steering knuckle arms without any alterations to the vehicle.

A still further object of my invention is to so design the device that it may be largely made from standard materials and thus be comparatively inexpensive to manufacture.

These objects, and other advantageous ends which will be described hereinafter, I attain in the following manner, reference being had to the accompanying drawings in which Figure 1 is a rear view, partly in section, and Figure 2 a top plan view of a preferred embodiment of my invention, certain parts being broken away.

Figure 3:
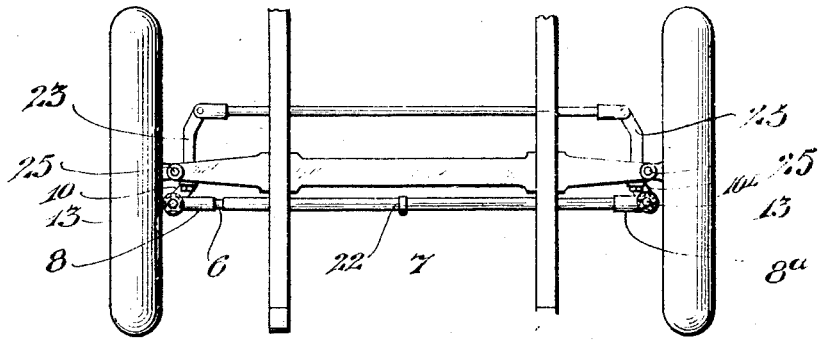

Figure 3 is a plan view of the front axle, and

Figure 4:
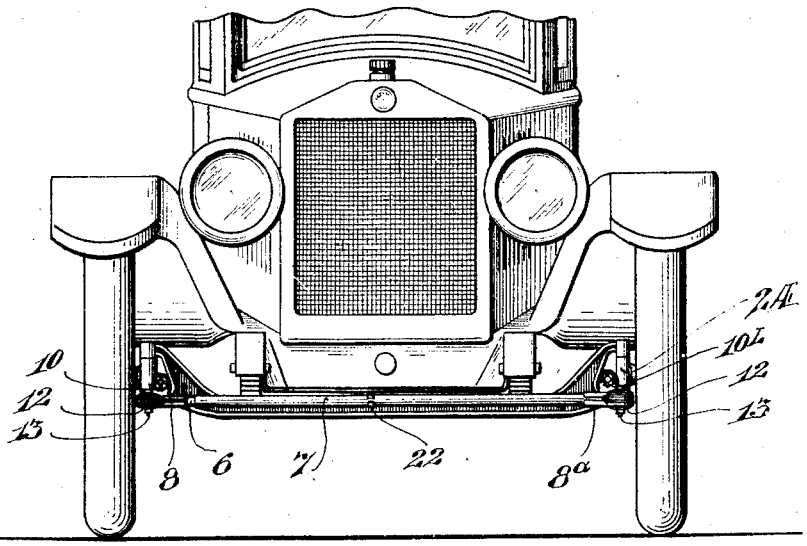

Figure 4 a fragmentary front view of a motor vehicle to which my invention has been applied.

Referring now more particularly to Figures 1 and 2, a short piece of tubing 6, which is preferably 5/8" in diameter, is inserted in a longer piece of tubing 7, which is preferably 3/4" in diameter. Two bent plates 8, having enlarged circular heads 9, are secured to one end of tubing 6, preferably by welding or brazing. One leg of an angular lug 10 is inserted between the heads 9 and is separated therefrom by fiber washers 11 disposed on either side of the lug and which provide frictional contact between the plates and the lug. A spring washer 12 is placed on the outside of each head 9 and is held in place by a bolt 13 passing through washers 12 and 11, heads 9 and lug 10. The device is secured to the steering knuckle of a motor vehicle by passing the end of the steering knuckle arm through an aperture 14 in the upstanding leg 15 of lug 10.

Tubing 7 is provided with bent plates 8ª which are similar in every respect to plates 8 with the exception that they are bent to fit 3/4" tubing instead of 5/8" tubing. A spring washer 12 is placed on the outside of each plate 8ª and fiber washers 11 on the inside with a lug 10ᴸ between the fiber washers. Lug 10ᴸ is opposite hand to lug 10.

A plug 16 is rigidly secured inside of tubing 7 and forms the seat for one end of a coiled spring 17, the other end of which bears against a metal washer 18 which is adapted to protect a felt washer 19 from the action of the spring. A plug 20 is inserted in tubing 6 flush with its end in order to provide an even bearing surface for washer 19. Midway between plug 16 and washer 18, an oil hole 21 is drilled through tubing 7 in order that lubrication may be provided for the moving parts within tubing 7. To prevent water and dirt from entering through oil hole 21, I provide a spring ring 22 encircling tubing 7 and adapted to cover the oil hole. The ends of ring 22 are spaced from one another and one of the ends is turned up to form a flange by means of which the ring may be rotated on the tubing to cover or expose oil hole 21.

Referring now more particularly to Figures 3 and 4, the device is mounted on a motor vehicle by removing the nuts from the front ends of steering knuckle arms 23, entering the exposed ends of these arms through apertures 14 in lugs 10, replacing the nuts and drawing the lugs firmly against steering knuckles 24. Bolts 13 are then tightened to produce the desired friction between fiber washers 11 and their contacing surfaces.

Ordinarily, the peripheries of the front wheels of a motor vehicle are free to move transversely until all the play in the bearings and joints between the wheel bearings and steering worm has been taken up. With my invention mounted on the vehicle, the side play in the wheel is retarded by a friction device disposed adjacent the spindle bolt 25 and cannot be added to by the clearances in the joints between the spindle and worm wheel. With bolts 13 properly adjusted, the vehicle will steer as easily as before but all wobbling of the wheels will have been eliminated.

In steering a motor vehicle to the right or left, one steering knuckle must turn inwardly and the other outwardly, then, as heads 9 are carried by lugs 10 in front of steering knuckles 24, it follows that the distance between the heads 9 will vary as the vehicle is turned. Consequently, I design lugs 10 so that bolts 13 may be positioned as close to the wheels as possible in order to reduce this variation and provide the telescoping feature previously described to accommodate the necessary variation.

While modern motor vehicles have the same tread, the distance between the steering knuckle arms varies according to the weight and type of vehicle and it is therefore necessary to provide steadying devices of different lengths to accommodate these different vehicles. This may be accomplished by providing tubings of different lengths or by securing plates 8ª to a short piece of tubing the same size as tubing 6, telescoping this tubing inside tubing 7 and securing it in the desired position by means of bolts or set screws.

While I have illustrated and described a preferred embodiment of my invention, it will be readily understood that various modifications might be made without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In combination with a motor vehicle having a pair of front wheels and a pair of steering knuckles, a device for steadying the front wheels including a lug secured to each steering knuckle, friction pieces against either side of each lug, a bifurcated head straddling each lug and making contact with the friction pieces, spring washers on either side of each head, means for maintaining pressure on the spring washers, a tubular member secured to one head, and an extension on the other head telescoping with the tubular member.

2. In combination with a motor vehicle having a pair of front wheels and a pair of steering knuckles, a device for steadying the front wheels including a lug secured to each steering knuckle, a head secured to and making frictional contact with each lug, a tubular member secured to one head, an extension on the other head telescoping in the tubular member, a stop in the tubular member, and a spring disposed between the stop and the end of the extension.

3. In combination with a motor vehicle having a pair of front wheels and a pair of steering knuckles, a device for steadying the front wheels including a lug secured to each steering knuckle, friction pieces against either side of each lug, a bifurcated head straddling each lug and making contact with the friction pieces, spring washers on either side of each head, means for maintaining pressure on the spring washers, a tubular member secured to one head, an extension on the other head telescoping in the tubular member, a stop in the tubular member, and a spring disposed between the stop and the end of the extension.

In testimony whereof I have signed my name to this specification.

WILHELM MOLLER.